United States Patent [19]

Kawahara et al.

[11] Patent Number: 5,109,440

[45] Date of Patent: Apr. 28, 1992

[54] IMAGE SENSING APPARATUS

[75] Inventors: Yukito Kawahara; Satoshi Machida; Hiroshi Mukainakano, all of Tokyo, Japan

[73] Assignee: Seiko Instruments Inc., Japan

[21] Appl. No.: 358,153

[22] Filed: May 26, 1989

[30] Foreign Application Priority Data

May 26, 1988 [JP] Japan .................. 63-130509

[51] Int. Cl.⁵ .................. G06K 9/28; H04N 3/14
[52] U.S. Cl. .................. 382/67; 358/213.11; 358/213.26; 358/213.31
[58] Field of Search .................. 382/58, 62, 65, 67; 358/213.12, 213.19, 212, 213.27, 213.17, 213.11, 213.13, 213.26, 213.31

[56] References Cited

U.S. PATENT DOCUMENTS

| | | | |
|---|---|---|---|
| 4,663,672 | 5/1987 | Sakamoto | 358/294 |
| 4,745,480 | 5/1988 | Kinugasa et al. | 358/213.18 |
| 4,788,522 | 11/1988 | Itagaki et al. | 358/212 |
| 4,835,617 | 5/1989 | Todaka et al. | 358/213.19 |

OTHER PUBLICATIONS

Japan Telecomm. Rev.,.vol. 19, No. 3, Jul. 1977, pp. 209-216, M. Orii et al., "Mini fax-A trial small-size facsimile".

Primary Examiner—Leo H. Boudreau
Attorney, Agent, or Firm—Bruce L. Adams; Van C. Wilks

[57] ABSTRACT

A plurality of opto-electro conversion elements are arranged integrally in a row to constitute a line image sensor to produce respective image bit signals. A plurality of switching elements are connected to the corresponding conversion elements and switchable between on and off states to read out the corresponding bit image signals. A scanning circuit scans sequentially the switching elements to successively turn on them to thereby effect the sequential reading of bit image signals. An initiating circuit is connected to the scanning circuit for generating an initiating signal effective to initiate the scanning circuit. An ending circuit is also connected to the scanning circuit and operates after the switching element of last stage is turned off for generating an ending signal indicative of the ending of scanning operation for one line. A control circuit receives the initiating and ending signals and produces a control signal. A gate circuit is commonly connected to the switching elements and made open according to the control signal to output the series of image bit signals.

17 Claims, 2 Drawing Sheets

IMAGE SENSING APPARATUS

BACKGROUND OF THE INVENTION

The present invention relates to an image sensing or reading apparatus for converting optical image information into electrical signals, and more specifically relates to an image line sensor of the integrated type having a plurality of opto-electro conversion elements aligned linearly in a row.

Recently, image reading apparatuses have been widely used in facsimiles and word processors for reading and inputting characters and figures as image data. Conventionally, these apparatuses are comprised of a plurality of opto-electro conversion elements for converting image information into electrical signals, corresponding switching elements and a scanning circuit for sequentially reading the image electrical signals obtained by the opto-electro conversion elements, and a control circuit for controlling the switching elements and scanning circuit.

FIG. 3 is a timing chart showing the operation of a conventional image reading apparatus of the line scanning type. The scanning circuit receives an initiating signal SI effective to initiate each line scanning of the linearly arranged opto-electro conversion elements through the corresponding switching elements and outputs an ending signal SO indicative of the ending of each line scanning when the n-th opto electro conversion element of the last stage is accessed to read out the corresponding n-th electrical signal SIG. The scanning circuit is responsive to clock pulses CK to sequentially scan the n number of conversion elements. The scanning circuit is comprised of n number of flipflops, and the last stage flipflop produces an output pulse, which is directly used as the ending signal SO so that the ending signal SO coincides with the last n-th electrical signal SIG.

Accordingly, in the above described conventional image reading apparatus, the last bit electrical signal SIG produced by the last stage conversion element includes switching noise due to the ending signal SO. Therefore, the signal to noise ratio (S/N ratio) is reduced which is an obvious drawback.

SUMMARY OF THE INVENTION

An object of the present invention is to, therefore, provide an improved image reading apparatus constructed to avoid the reduction of SN ratio of the last bit image electrical signal in spite of the occurrence of the ending signal for the scanning operation.

In order to realize the above object, according to the present invention, the image reading apparatus is comprised of a plurality of opto-electro conversion elements integrally arranged in one row, a plurality of switching elements correspondingly connected to the respective opto-electro conversion elements for sequentially reading out bit electrical signals produced by the respective opto-electro conversion elements, a scanning circuit for sequentially scanning the switching elements to drive and activate the same, an initiating signal generating circuit connected to the scanning circuit for generating an initiating signal effective to initiate the scanning circuit, an ending signal generating circuit connected to the scanning circuit and operative after the last switching element is made non-conductive for producing an ending signal indicative of the ending of the sequential scanning in one row, a control circuit receptive of the initiating and ending signals to produce a control signal, and an additional switching circuit commonly connected to the forementioned switching elements for sequentially outputting the bit image electrical signals according to the control signal.

DETAILED DESCRIPTION OF PREFERRED EMBODIMENT

Figure 1:
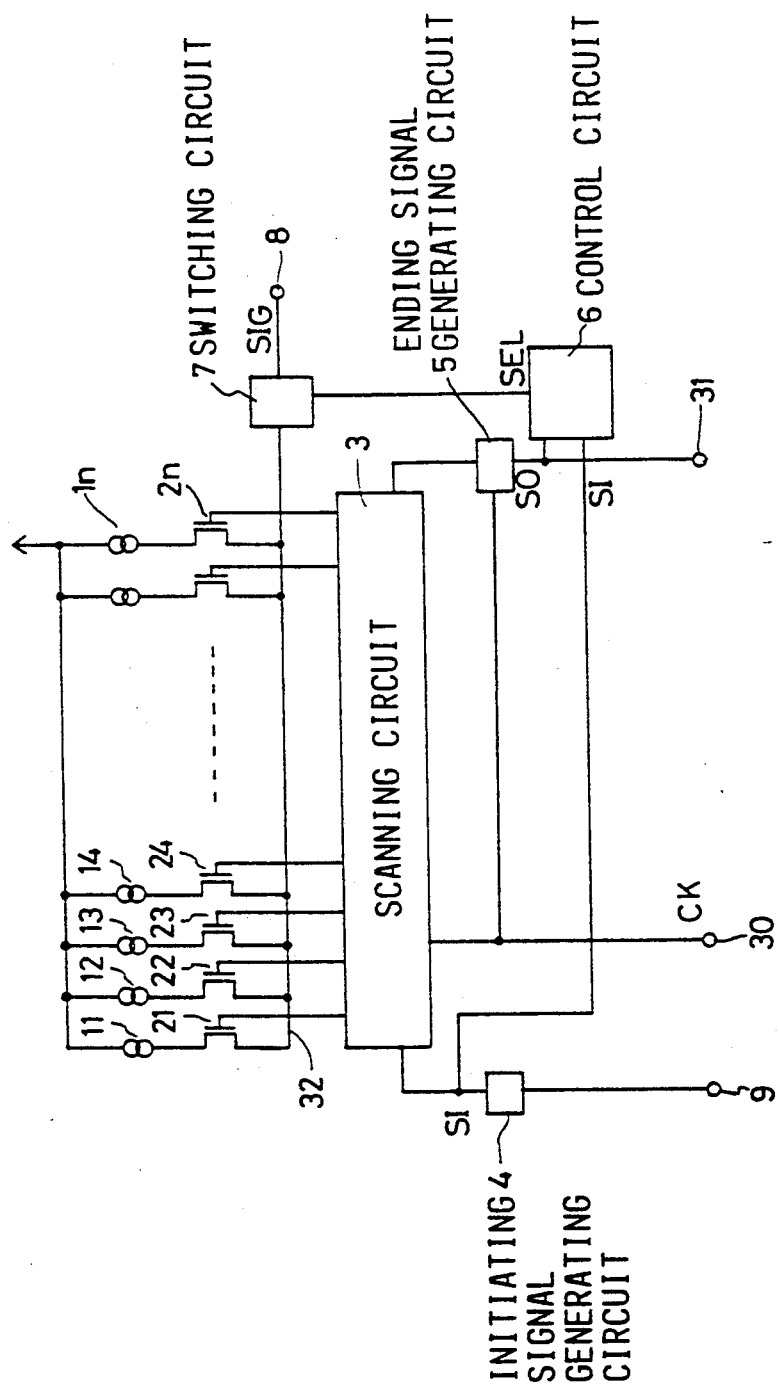
FIG. 1 is a schematic circuit block diagram showing the image reading apparatus according to the present invention.

Hereinafter, a preferred embodiment of the present invention will be explained in conjunction with the drawings. As shown in FIG. 1, the inventive image reading or sensing apparatus includes a plurality of opto-electro conversion elements 11, 12, . . . , 1n arranged integrally in a row to constitute line image sensor. Each of the conversion elements operates to convert bit image information into a (corresponding bit electrical signal. A plurality of switching elements 21, 22, . . . , 2n are connected between the corresponding respective conversion elements 11, 12, . . . , 1n and a common output signal line 32, and are operable to switch between the ON and OFF states to selectively feed the corresponding bit electrical signals to the common output signal line 32. A scanning circuit 3 is composed of, for example, a plurality of multi-stage flipflops and is connected to the switching elements 21, 22, . . . , 2n for sequentially scanning them to selectively switch them. The scanning circuit 3 is responsive to clock pulses CK fed from a clock input terminal 30 to sequentially produce scanning pulses effective to sequentially turn on the switching elements 21, 22, . . . , 2n in this order. An initiating signal generating circuit 4 is connected between a pulse input terminal 9 and the scanning circuit 3 for generating an initiating pulse signal SI effective to initiate the scanning circuit 3 to start the scanning operation. An ending signal generating circuit 5 is connected to the last stage flipflop of the scanning circuit 3 and operative after the last stage switching element 2n is turned off for generating an ending pulse signal SO to an output terminal 31 indicating that the scanning operation of one line is finished. In the image reading apparatus of multi-chip line sensor type, this ending pulse signal SO is utilized as the next initiating signal SI for initiating pulse the next line scanning operation. A control circuit 6 receives the initiating signal SI and the ending signal SO and produces a control or select signal SEL. An additional switching circuit 7 is connected to the common image signal line 32 and is driven according to the control signal SEL to feed sequentially the bit image electrical signals SIG to an image signal output terminal 8.

Figure 2:
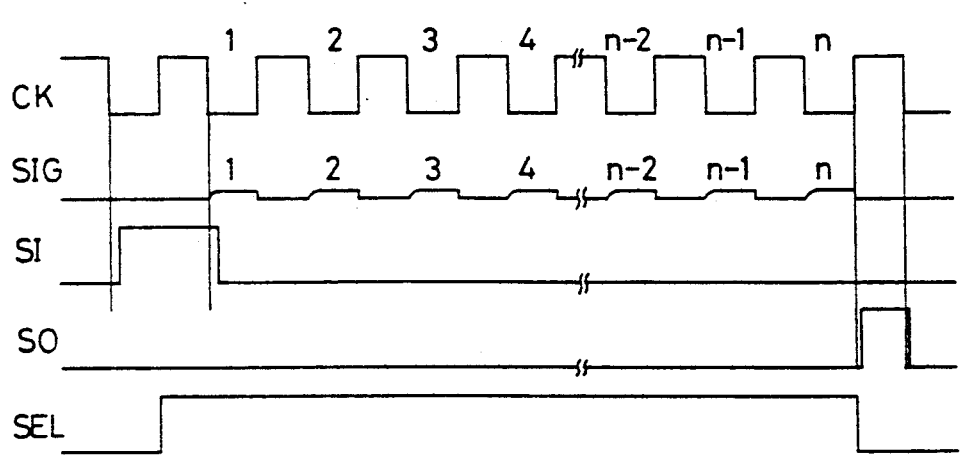
FIG. 2 is a timing chart to illustrate the operation of FIG. 1 apparatus.

FIG. 2 is a timing chart illustrating the reading or sensing operation of FIG. 1 embodiment. The scanning circuit 3 is initiated in response to the initiating signal SI to start the sequential scanning of the switching elements 21, 22, . . . , 2n to sequentially turn them on to thereby transfer the bit image signals SIG produced by the corresponding opto-electro conversion elements 11, 12 . . . , 1n to the common image signal line 32. In order to turn on the i-th switching element 2i (i=1, 2, ..., n), the scanning circuit 3 is driven in response to the trailing edge of the i-th clock pulse CK t produce a scanning pulse effective to turn on the corresponding i-th switching element 2i for the duration during which the i-th clock pulse is held at a low level. Consequently, the i-th bit image signal SIG generated by the i-th conversion element 1i (i=1, 2, ..., n) is transferred through the corresponding conductive i-th switching element to the common image signal line 32. The transferred i-th bit analog image signal is outputted through the switching or gate circuit 7 to the image output terminal 8.

Figure 3:
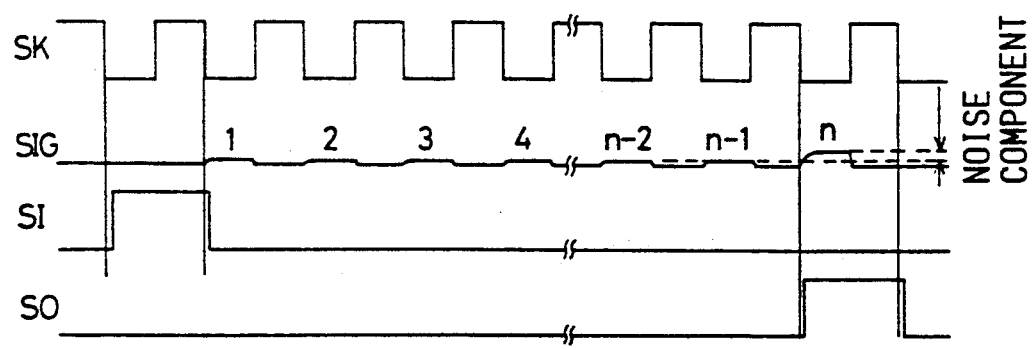
FIG. 3 is a timing chart to illustrate the operation of the conventional image reading apparatus.

The ending signal generating circuit 5 is operated immediately after the last n-th bit image signal is outputted from the n-th opto-electro conversion element 1n of the last stage for generating the ending signal SO. As opposed to the conventional operation shown in FIG. 3, the ending signal SO does not coincide with the last bit image signal, but is shifted therefrom so that the last bit image signal does not have added thereto a noise component due to the ending signal. Therefore, even when reading or sensing a dark image, each bit image signal SIG has a uniform signal level substantially free from noise as shown in FIG. 2.

Lastly, the control circuit 6 produces the control signal SEL during one line scanning operation immediately after the occurrence of the initiating signal SI and immediately before the occurrence of the ending signal SO. The control signal SEL is effective to turn on the gate circuit 8 only during each line scanning operation to thereby sequentially output the series of bit image signals SIG from the common image signal line 32 to the image signal output terminal 8.

Though each switching element is composed of a single MOS transistor for simplification in the FIG. 1 embodiment, the individual switching element may be composed of CMOS transistors. Further, through the scanning circuit is driven in response to trailing edges of the clock pulses CK in this embodiment, the scanning circuit may be driven in response to leading edges of the clock pulses CK. In such case, other circuits may be modified accordingly.

According to the present invention, the ending signal indicative of the ending of one line scanning is produced after the last bit image signal is read out from the last opto-electro conversion element to prevent noise due to the ending signal from being superposed on the bit image signal to thereby achieve the advantage that the S/N ratio of the image sensing apparatus can be improved.

What is claimed is:

1. An image sensing apparatus comprising:
   a plurality of IC reading chips disposed in a row to define a multi-chip line sensor, each IC reading chip comprising
   a plurality of opto-electro conversion elements arranged integrally in a row to constitute a line image sensor for effecting opto-electro conversion to produce respective bit image signals,
   a plurality of switching elements connected to the corresponding opto-electro conversion elements and switchable between on and off states to read out the corresponding bit image signals,
   a scanning circuit for scanning sequentially the switching element to sequentially turn them on to thereby effect the sequential reading of the bit image signals,
   an initiating signal generating circuit connected to the scanning circuit for generating an initiating signal effective to initiate the scanning circuit,
   an ending signal generating circuit connected to the scanning circuit and operative immediately after the switching element of the last stage is turned off for generating an ending pulse signal shifted from the reading of the last bit image signal and indicative of the ending of the scanning operation,
   a control circuit receptive of the initiating signal and ending pulse signal to produce a control signal, and
   a switching circuit switchable according to the control signal to output the bit image signals; and
   wherein the ending pulse signal from a preceding IC reading chip is applied to a succeeding IC reading chip as the initiating signal thereof.

2. An image sensing apparatus according to claim 1; wherein each of the switching elements comprises MOS transistor.

3. An image sensing apparatus according to claim 1; wherein the control circuit includes means for producing the control signal after the receipt of the initiating signal and before the receipt of the following ending pulse signal.

4. An image sensing apparatus according to claim 3; wherein the switching circuit comprises a gate circuit connected commonly to the switching elements and made open according to the control signal to output the series of image bit signals during the scanning operation for one line.

5. An image sensing apparatus comprising: a plurality of IC reading chips disposed in a row to define a multi-chip line sensor, each IC reading chip comprising a row of opto-electro conversion elements for converting image information into corresponding electrical image signals, scanning means operative when initiated to sequentially scan the row of opto-electro conversion elements to sequentially read out therefrom the corresponding electrical image signal, first means for producing an initiating signal and applying the same to the scanning means to initiate the scanning operation thereof, and second means coating with the scanning means for producing an ending signal immediately after completion of the reading out of the last electrical image signal; and wherein the ending signal from a preceding IC reading chip is applied to a succeeding IC reading chip as the initiating signal thereof.

6. An image sensing apparatus according to claim 5; including control means receptive of the initiating and ending signals for producing a control signal during the interval between the initiating signal and the ending signal; and switch means connected to receive the electrical image signals read out by the scanning means and responsive to the control signal for transmitting therethrough the electrical image signals.

7. An image sensing apparatus according to claim 6; wherein the scanning means comprises plural switching means connected to respective ones of the opto-electro conversion elements and switchable between on and off states to read out the corresponding electrical image signals, and a scanning circuit for sequentially scanning the plural switching means to sequentially switch them to the on state to effect sequential reading out of the electrical image signals.

8. An image sensing apparatus according to claim 7; wherein the plural switching means comprise switching transistors.

9. An image sensing apparatus according to claim 8; wherein the switching transistors comprise MOS transistors.

10. An image sensing apparatus according to claim 7; wherein the switch means comprises a gate circuit responsive to the control signal for gating therethrough the electrical image signals.

11. An image sensing apparatus according to claim 7; wherein the first means includes means for producing an initiating pulse signal; the second means includes means for producing an ending pulse signal; and the control means includes means for producing a control pulse signal having a pulse duration which begins during the occurrence of the initiating pulse signal and which ends before the occurrence of the ending pulse signal.

12. An image sensing apparatus according to claim 11; wherein the initiating pulse signal has a longer pulse duration than that of the ending pulse signal.

13. An image sensing apparatus according to claim 6; wherein the first means includes means for producing an initiating pulse signal; the second means includes means for producing an ending pulse signal; and the control means includes means for producing a control pulse signal having a pulse duration which begins during the occurrence of the initiating pulse signal and which ends before the occurrence of the ending pulse signal.

14. An image sensing apparatus according to claim 13; wherein the initiating pulse signal has a longer pulse duration than that of the ending pulse signal.

15. An image sensing apparatus according to claim 5; wherein the scanning means comprises plural switching means connected to respective ones of the opto-electro conversion elements and switchable between on and off states to read out the corresponding electrical image signals, and a scanning circuit for sequentially scanning the plural switching means to sequentially switch them to the on state to effect sequential reading out of the electrical image signals.

16. An image sensing apparatus according to claim 15; wherein the plural switching means comprise switching transistors.

17. An image sensing apparatus according to claim 16; wherein the switching transistors comprise MOS transistors.

* * * * *